Figures 1, 2:
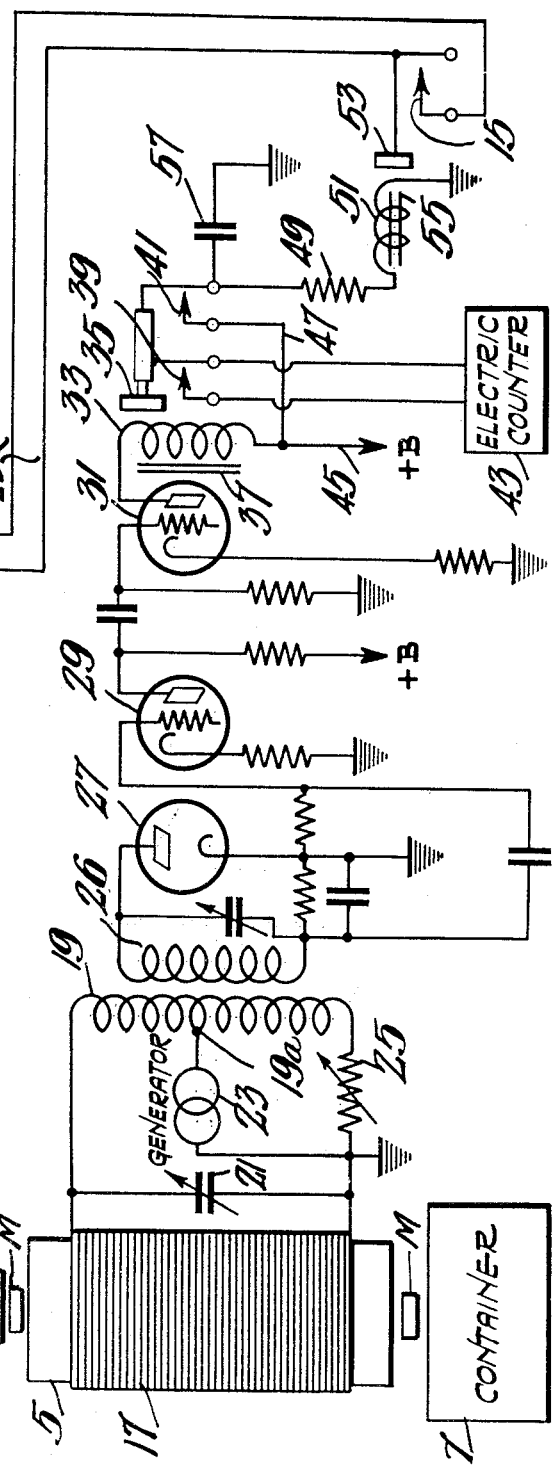

Dec. 21, 1943.  H. R. SHAW  2,337,132
ELECTRONIC CONTROL
Filed Aug. 31, 1942

Inventor
HUBERT R. SHAW
By
C. D. Tuska
Attorney

Patented Dec. 21, 1943

2,337,132

UNITED STATES PATENT OFFICE 2,337,132

ELECTRONIC CONTROL

Hubert R. Shaw, Drexel Hill, Pa., assignor to Radio Corporation of America, a corporation of Delaware Application August 31, 1942, Serial No. 456,784

4 Claims. (Cl. 192—125)

This invention relates to an improved electronic apparatus for controlling the operation of one or more electrical or mechanical devices and has for its principal object to provide a reliable yet simple and compact electronic control unit.

Another object of the invention is to provide an improved electronic control incorporating an inductively actuated relay which is responsive to changes in the rate of operation of the controlled device.

Other objects and advantages will be apparent and the invention itself will be best understood by reference to the following specification and to the accompanying drawing, wherein:

Figure 1 is a schematic view of an electronic control unit within the invention and showing one of the numerous uses to which it may be put, and Figure 2 is an alternative form of coupling circuit which may be employed in carrying the invention into effect.

While the invention will be described as applied to the control of a typical metal working machine, it will be understood that the disclosure in this respect is merely illustrative and that the invention will find useful application in various arts.

In Fig. 1, I designates generally a punch press or other metal working machine wherein the metal articles M subsequent to being worked are ejected one by one into a hopper 3 and thence through a coil form 5 into a bin or container 7. The machine I is shown as supplied with operating current from a suitable source indicated generally at 9 through a path 13 containing an auxiliary switch 15 which, when closed, will be understood to permit the machine I to function at a certain speed or rate of operation.

The form 5 through which the metal articles M pass to the bin 7 comprises a support for an inductance coil 17 which, together with a center-tap coil 19, a tuning capacitor 21, an oscillation generator 23, and a balancing resistor 25, form a normally balanced bridge circuit which is periodically unbalanced by the passage of the metal articles M through the coil 17. Alternatively, as shown in Fig. 2, the center tap 19a and balancing resistor 25 of Fig. 1 may be omitted, in which case the generator 23 is preferably connected in series with the tuned circuit 17—21 and the coil 19.

In one commercial application of the invention where the control unit was designed for use with a machine for making metal caps for bottles, the generator 23 comprised a vacuum tube oscillator tuned to a frequency of the order of 100 kilocycles.

As above indicated, the passage of the metal articles M through the coil 17 changes the effective inductance and the "Q"

$$\left(Q = \frac{2\pi f 1}{R}\right)$$

of the coil 17. In the embodiment of the invention shown in Fig. 1, this causes an unbalance in the current supplied to the two halves of the tapped coil 19 and a resulting voltage across the terminals of the said coil. Where the oscillator is connected as shown in Fig. 2, the above described change in "Q" in the coil 17 results in a change in the current flowing in coil 19 which, in either case, is manifest as a change in the voltage appearing in a preferably tuned secondary coil 26 which is shown connected between the filament and plate of a rectifier 27 which delivers the resulting pulsating direct current to a two-stage amplifier comprising vacuum tubes 29 and 31. The amplified current pulses in the output circuit of the tube 31 flow through a winding 33 and attract the armature 35 to an iron core 37. Movement of the armature 35 closes two switches 39 and 41, respectively. When switch 39 is closed, a circuit is completed to a suitable counting device 43 which thus registers the number of separate metal articles passing through the coil 17.

When the switch 41 is closed, a circuit is completed from the "B" supply lead 45 through a switch lead 47, a resistor 49 and a relay winding 51 which attracts an armature 53 to an iron core 55 and closes the switch 15 in the power supply line 13 of the machine I. As long as the switch 15 is closed, this machine I may, of course, function to produce the articles M at its usual speed or rate of operation. Since the switch 41 remains closed only during the passage of each separate metal article M through the coil 17, it is necessary to provide some auxiliary means for maintaining the switch 15 closed during the normal time interval between the delivery of the said articles to the said coil. To this end, a capacitor 57 is connected in parallel with the serially connected resistor 49 and relay winding 51. The capacitor 57 thus receives a charging current from the line 45 each time the switch 41 is closed by the passage of one of the metal articles M through the coil 17. The value of the said capacitor 57 and of the resistor 49 are so chosen that the release of the accumulated charge in the capacitor 57 through the said resistor 49 and winding 51 will maintain the switch 15 closed for a period at least as long as the normal interval between the delivery of the metal articles M to the coil 17. If there is an abnormally long interval between the delivery of the articles, the switch 41 will remain open; the capacitor 57 will therefore not immediately be recharged and its accumulated charge will leak off, causing the switch 15 to open the power supply line 13 thereby halting the operation of the machine 1.

From the foregoing it is apparent that the present invention provides a reliable yet simple and compact electronic control unit incorporating an inductively actuated relay which is responsive to changes in the rate of operation of the controlled device.

What is claimed is:

1. In combination, a controlled device having a certain rate of operation, a control circuit for said device, means responsive to the operation of said device at said certain rate for periodically energizing said control circuit, and a relay operatively connected between said circuit and said device and adapted to be maintained in a given operating position when periodically energized by said circuit at said rate.

2. A control system for a machine of the type adapted to produce metal articles at a desired rate, means for generating a high frequency inductive field, means for passing said metal articles at said desired rate through the said inductive field to produce a correspondingly periodic change in said field, and means responsive to variations in the rate of said periodic change for producing a force adapted to control the operation of the said machine.

3. In combination, a controlled device adapted to produce metal articles at a certain rate, means for operating said device at said rate, a normally balanced control circuit including a circuit element through which said articles are adapted to pass, means responsive to the passage of said articles through said circuit element at said rate for periodically unbalancing said normally balanced control circuit, a relay operatively connected between said circuit and said controlled device and adapted to be maintained in a given operating position when periodically energized by said circuit at said certain rate, and means responsive to a decrease in the rate of production of said metal articles for changing the operating position of said relay and hence the operating condition of said controlled device.

4. In combination, a controlled device having a certain rate of operation, means for operating said device at said rate, a control circuit for said device, means responsive to the operation of said device at said certain rate for periodically energizing said control circuit, a relay operatively connected between said circuit and device and adapted to be maintained in a given operating position when periodically energized by said circuit at said rate, and means responsive to a decrease in the rate of operation of said controlled device for changing the operating position of said relay and hence the operating condition of said controlled device.

HUBERT R. SHAW.